United States Patent
Galindo-Legaria et al.

(10) Patent No.: US 8,255,387 B2
(45) Date of Patent: *Aug. 28, 2012

(54) SYSTEMS AND METHODS FOR MODELING PARTITIONED TABLES AS LOGICAL INDEXES

(75) Inventors: Cesar A. Galindo-Legaria, Redmond, WA (US); Craig S. Freedman, Sammamish, WA (US); Milind M. Joshi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 61 days.

This patent is subject to a terminal disclaimer.

(21) Appl. No.: 12/833,670

(22) Filed: Jul. 9, 2010

(65) Prior Publication Data

US 2010/0274780 A1      Oct. 28, 2010

Related U.S. Application Data

(63) Continuation of application No. 11/735,683, filed on Apr. 16, 2007, now Pat. No. 7,792,822.

(60) Provisional application No. 60/892,607, filed on Mar. 2, 2007.

(51) Int. Cl.
*G06F 7/00* (2006.01)

(52) U.S. Cl. .......................................... 707/713; 707/765

(58) Field of Classification Search .................. 707/713, 707/714, 715, 718, 765
See application file for complete search history.

(56) References Cited

U.S. PATENT DOCUMENTS

| | | | |
|---|---|---|---|
| 5,551,027 A | 8/1996 | Choy et al. | |
| 5,625,815 A | 4/1997 | Maier et al. | |
| 5,664,172 A | 9/1997 | Antoshenkov | |
| 5,710,915 A | 1/1998 | McElhiney | |
| 5,960,194 A | 9/1999 | Choy et al. | |
| 6,374,232 B1 | 4/2002 | Dageville et al. | |
| 6,405,198 B1 | 6/2002 | Bitar et al. | |
| 6,546,394 B1 | 4/2003 | Chong et al. | |
| 6,625,593 B1 | 9/2003 | Leung et al. | |
| 6,795,821 B2 | 9/2004 | Yu | |
| 6,944,633 B1 | 9/2005 | Higa et al. | |
| 7,047,250 B1 | 5/2006 | Agarwal et al. | |
| 7,146,365 B2 | 12/2006 | Allen et al. | |
| 7,158,996 B2 | 1/2007 | Croisettier et al. | |
| 7,461,050 B2 * | 12/2008 | Corvinelli et al. | 1/1 |
| 2005/0251524 A1 | 11/2005 | Shukla | |
| 2007/0078813 A1 * | 4/2007 | Beavin et al. | 707/2 |

OTHER PUBLICATIONS

International Search Report for PCT/US2008/055716 mailed Aug. 14, 2008. 10 Pages.

(Continued)

*Primary Examiner* — Amy Ng
(74) *Attorney, Agent, or Firm* — L. Alan Collins; Collins & Collins Intellectual, LLC

(57) ABSTRACT

Technologies for forming logical indexes and utilizing such indexes so as to abstract many of the complexities resulting from referencing partitioned database tables. Included are technologies for making use of order-preserving properties of table metadata, for adding a partition equality predicate to an explicit predicate in merge-join processing on partitioned tables, and for selecting execution of a logical skip scan on a partitioned table when a query predicate does not reference a specific partition. Such technologies generally abstract from the query writer and processing systems explicit referencing of table partitions.

17 Claims, 6 Drawing Sheets

OTHER PUBLICATIONS

David Beulke, "Terabyte Data Warehouse Table Design Choices—Part 1"; Jan. 5, 2007. http://www.dbazine.com/db2/db2-mfarticles/beulke3.

Harry Leslie, et al; "Efficient Search of Multidimensional B-Trees"; Tandem Computers Incorporated; Cupertino, CA 95014-2542; Proceedings of the 21$^{st}$ VLDB Conference; Zurich, Switzerland, 1995. http://www.sigmod.org/vldb/conf/1995/P710.PDF.

Eugene I. Chong, et al; "A Mapping Mechanism to Support Bitmap Index and Other Auxiliary Structures on Tables Stored as Primary B+-trees"; Oracle Corporation; One Oracle Drive, Nashua, NH 03062; Sigmod Record, vol. 32, No. 2, Jun. 2003 http://delivery.acm.org/10.1145/780000/777000/p78-chong.pdf?key1=777000&key2=4494197611&coll=GUIDE&dl=GUIDE&CFID=75919783&CFTOKEN=92791909.

* cited by examiner

US 8,255,387 B2

SYSTEMS AND METHODS FOR MODELING PARTITIONED TABLES AS LOGICAL INDEXES

CROSS-REFERENCE TO RELATED APPLICATIONS

This application is a Continuation of U.S. patent application Ser. No. 11/735,683, filed on Apr. 16, 2007, that claims benefit to U.S. Provisional Patent Application No. 60/892,607 filed on Mar. 2, 2007.

BACKGROUND

Partitioned database tables provide some advantages but also result in additional complexity over non-partitioned tables. For example, the queries for dealing with partitioned tables can be more complex than those for non-partitioned tables. Further, query optimization and query execution must deal with the added complexity resulting from querying partitioned tables, thus detracting from the benefits.

SUMMARY

The following presents a simplified summary of the disclosure in order to provide a basic understanding to the reader. This summary is not an extensive overview of the disclosure and it may not identify key or critical elements of the invention, or delineate the scope of the invention. Its sole purpose is to present some concepts disclosed herein in a simplified form as a prelude to the more detailed description that is presented later.

The present examples provide technologies for forming logical indexes and utilizing such indexes to abstract many of the complexities resulting from referencing partitioned database tables. Included are technologies for making use of order-preserving properties of table metadata, for adding a partition equality predicate to an explicit predicate in merge-join processing on partitioned tables, and for selecting execution of a logical skip scan on a partitioned table when a query predicate does reference a specific partition. Such technologies generally abstract from the query writer and processing systems explicit referencing of table partitions.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the invention and/or present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in database and computing systems, the systems described are provided as examples and not limitations. The present examples are suitable for application in a variety of different types of database and computing systems. For example, the present examples are suitable for application in database and computing systems that process or execute queries using iterators, by compiling them into machine code, pcode, or any other code or language, or via any other query processing system or the like.

Figure 1:
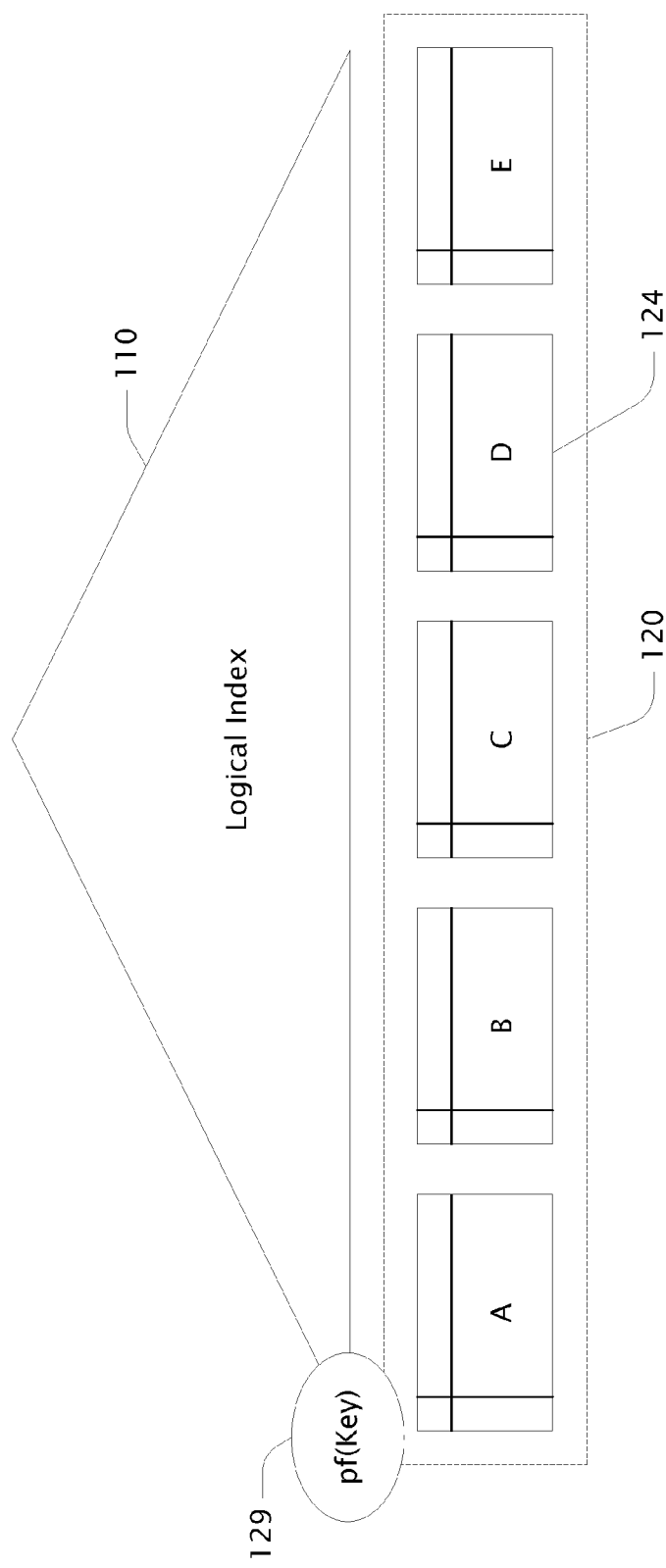
FIG. 1 is block diagram showing an example logical index on an example partitioned database table including example metadata.

FIG. 1 is block diagram showing an example logical index 110 on an example partitioned database table 120 including example metadata 129. Logical index 110 represents an index created using methods of the present invention and is typically used to model a database table. For example, a logical index may model a partitioned heap (a non-indexed table), a partitioned table, a partitioned index, or the like. Database table 120 is partitioned or fragmented into five example partitions 'A' through 'E', such as example partition 124. Each partition typically includes a unique partition identifier ("partition ID" or "pID"). The term "partitioned" as used herein generally refers to partitioned tables and/or fragmented tables. The term "table" as used herein generally refers to database tables and/or database indexes. Example metadata 129 is associated with table 120 and is shown to include partition function pf(Key) where Key is a partition key ("Key"). A partition function ("pf" or "pf( )"), such as pf(Key), typically returns a partition identifier. Other data may also be included in metadata 129, the other data typically associated with the partitions of example table 120. Partitions may or may not include key columns, such as in the case of round-robin partitioning which typically does not make use of partition keys. In general, the notation (a, b, c, . . . ) used herein represents a table with columns (a, b, c, and so on, or an index with index keys a, b, c, and so on. For example, a logical index including a first or leading column for partition ID, a second column for last name, and a third column for first name may be represented as (pID, LAST_NAME, FIRST_NAME). Such notation generally applies herein to tables, logical indexes, conventional indexes, and the like. In general, a table can be partitioned on a key(s) (the partition key) and indexed on a different key(s) (the index key).

In another example, a table may be partitioned in two or more dimensions. Such partitioning is commonly referred to as hybrid partitioning. For example, consider a table (or index on a table) with columns (a, b). Such a table may be, for example, range partitioned on $pf_{range}(a)$ and simultaneously hash partitioned on $pf_{hash}(b)$ where a and b may represent the same or different columns/keys and/or comprise multiple columns/keys. Given the example predicate ((a=1) AND (b=2)), to locate the correct partition both partition functions $pf_{range}(a)$ and $pf_{hash}(b)$ are typically evaluated. A logical index may be formed on such a hybrid partitioned table and/or index, the logical index typically including two or more partition ID columns. The order of such partition ID columns may vary and are typically the leading columns of the logical index. For example, we may form a logical index ($pID_A$, $pID_B$, key(s)) where $pID_A=pf_{range}(a)$ and $pID_B=pf_{hash}(b)$ and key(s) represent zero or more additional indexed columns/keys. Thus, in the case of hybrid partitioning, multiple partition functions may be used as the partition function.

Figure 2:
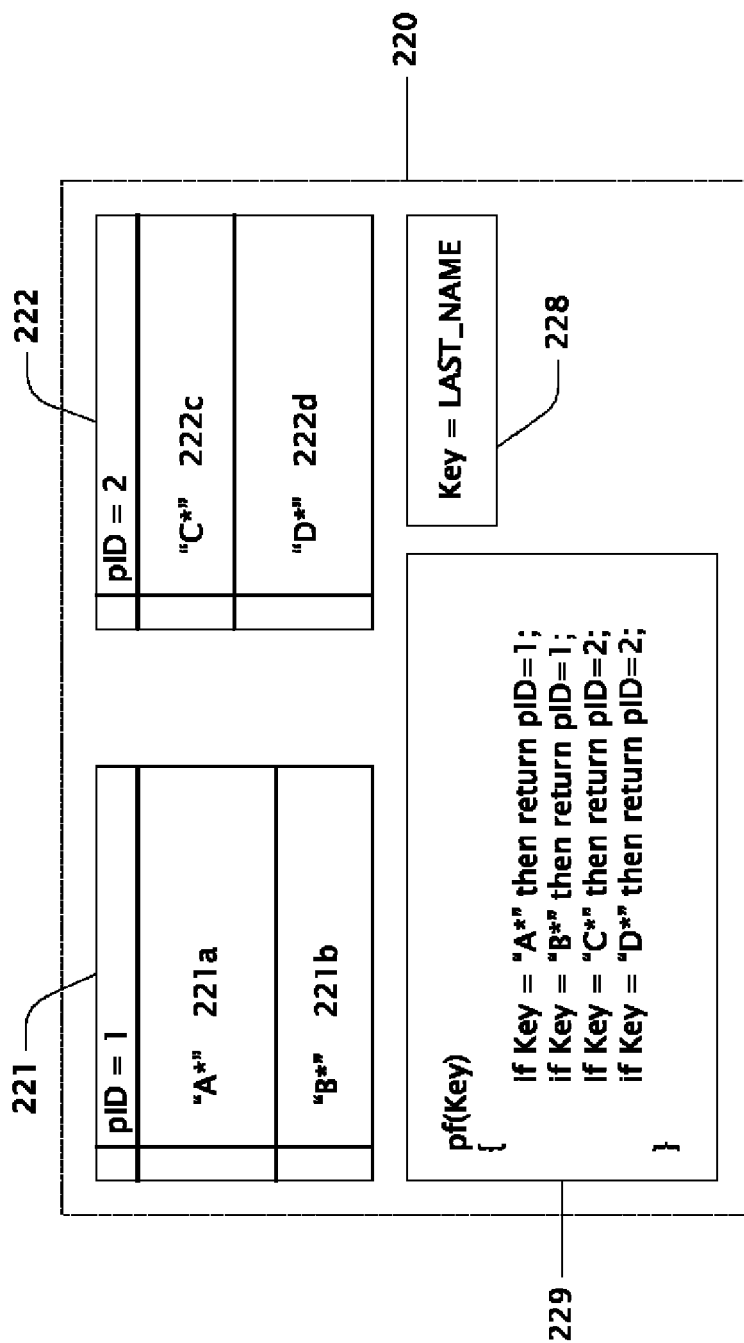
FIG. 2 is a block diagram showing another example partitioned database table including two example partitions and example metadata.

FIG. 2 is a block diagram showing another example partitioned database table 220 including two example partitions 221 and 222 and example metadata 228 and 229. Partitions 221 and 222 include data keyed by LAST_NAME, as indicated by metadata 228, where section 221a contains data with last names beginning with the letter 'A' and section 221b contains data with last names beginning with the letter 'B'. Similarly, section 222c of partition 222 contains data with last names beginning with the letter 'C' and section 222d contains data with last names beginning with the letter 'D'. Partitions 221 and 222 each include partition IDs, were pID=1 identifies partition 221 and pID=2 identifies partition 222. Other partitions, not shown and not essential for purposes of this example, may include additional data with last names beginning with the letters 'E' through 'Z' or the like. Example partitions 221 and 222 are formed using range partitioning such that partitions 221 and 222 include all rows of table 220 where the LAST_NAME column consists of strings beginning with the letters 'A' or 'B' in partition 221 and the letters 'C' or 'D' in partition 222. Partitions formed using other types of partitioning may also be supported by logical indexes, including partitions formed using hash partitioning, list partitioning, round-robin partitioning, hybrid partitioning, and other forms of partitioning.

Metadata 229 defines example partition function pf(Key), a range partition function, for partitions 221 and 222 as follows:

```
pf (Key)
{
    if Key = "A*" then return pID=1;
    if Key = "B*" then return pID=1;
    if Key = "C*" then return pID=2;
    if Key = "D*" then return pID=2;
}
``` where if input Key="A*", a string beginning with the letter 'A', then pf(Key) returns pID=1 identifying partition 221, and so on as defined. In general, pf(Key) identifies partition 221 for any input string for Key beginning with the letters 'A' or 'B' and identifies partition 222 for any input string beginning with the letters 'C' or 'D'. In general, partition function pf(Key) returns the partition ID of the table partition containing the row(s) of the table that corresponds to Key. Note that Key may represent an index key column value or a non-index key column value. In alternate examples, index keys and query predicates may be comprised of any suitable data type. Further, any suitable partition function may be used. In one example, a partition function does not reference any table or index columns, such as with round-robin partitioning wherein the partition function may assign successive rows to the next partition. Alternatively, a partition function may reference a table column not present in an index, or a non-leading index column, or multiple columns in an index and/or a table. In general, a partition function may reference zero, one, or multiple index and/or table columns.

Figure 3:
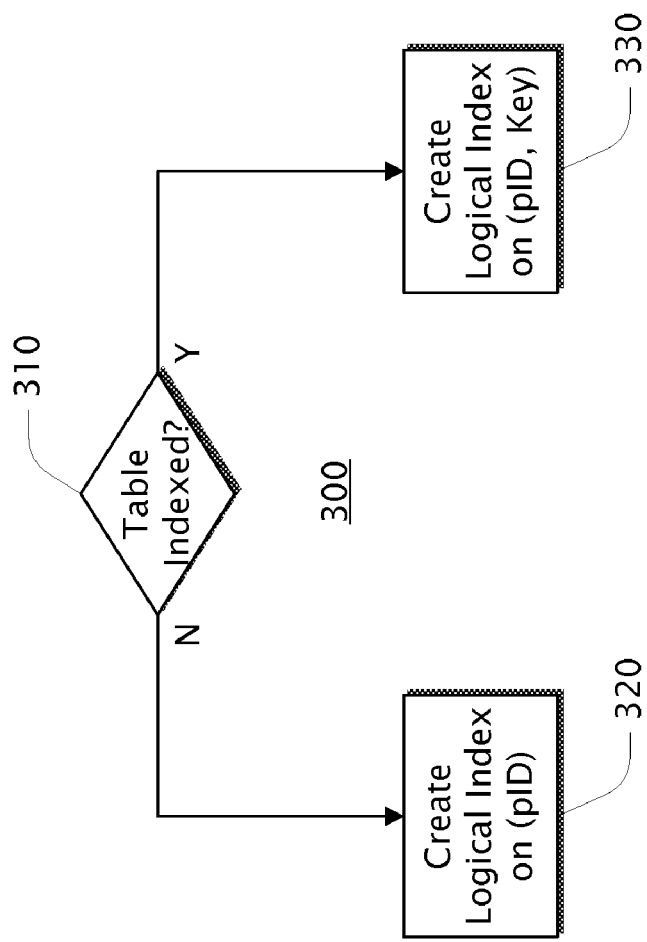
FIG. 3 is a block diagram showing an example method for creating a logical index.

FIG. 3 is a block diagram showing an example method 300 for creating a logical index. A "logical index", as opposed to a conventional index, is an index on a partitioned table or index including one or more partition ID columns, typically the leading columns. In alternate examples, the logical index partition ID column may not be the leading column. A logical index may or may not include a partition key or an index key. For example, a logical index on a partitioned heap typically does not include partition keys or index keys. Such a logical index may be created for any horizontally partitioned table.

Block 310 indicates determining if the partitioned table is indexed on a key. For example, the partitions of table 220 shown in FIG. 2 are indexed on the LAST_NAME column with the LAST_NAME row values being considered key values. Other tables, including partitioned heaps, may not be indexed. If the partitioned table is not indexed, then method 300 typically continues at block 320. If the partitioned table is indexed, then method 300 typically continues at block 330.

Block 320 indicates creating a logical index on a non-indexed partitioned table. This is typically accomplished by forming a logical index (pID). Once the logical index has been created, method 300 is typically complete.

Block 330 indicates creating a logical index on an indexed partitioned table. This is typically accomplished by forming a logical index (pID, Key), the leading column for pID followed by the key column(s) from the partitioned table's index. The pID value in each row of the logical index's pID column is typically calculated using a partition function pf(Key) where each row value pID=pf(Key) where Key is the key value(s) of the corresponding row in the logical index. Key may represent an index key column(s) or any other index and/or table column(s). Thus the pID column can be considered a computed column where the row values are defined as pf(Key). Once the logical index has been created, method 300 is typically complete.

Some partition functions are order preserving functions, such as range partition functions and the like. The term "order preserving function" as used herein generally implies, for example, that if key1>key2 then pf(key1)>=pf(key2). For example, given the names "Freedman" for key1 and "Collins" for key2 where "Freedman">"Collins" using a string compare, then pf(key1) may return 4, for example, referring to partition 4, while pf(key2) may return any partition number less than or equal to 4, meaning that "Collins" is in an earlier partition than "Freedman" ('>'), or in the same partition ('='). More generally, given a logical index (pID, Key) where the logical index is formed on an order-preserving partitioned table, and where partition function pf(Key) is order-preserving on Key, then a sort on (pID, Key) returns the same sort order result as a sort on (Key). Other partition functions, such as hash partition functions, may not be order preserving.

Figure 4:
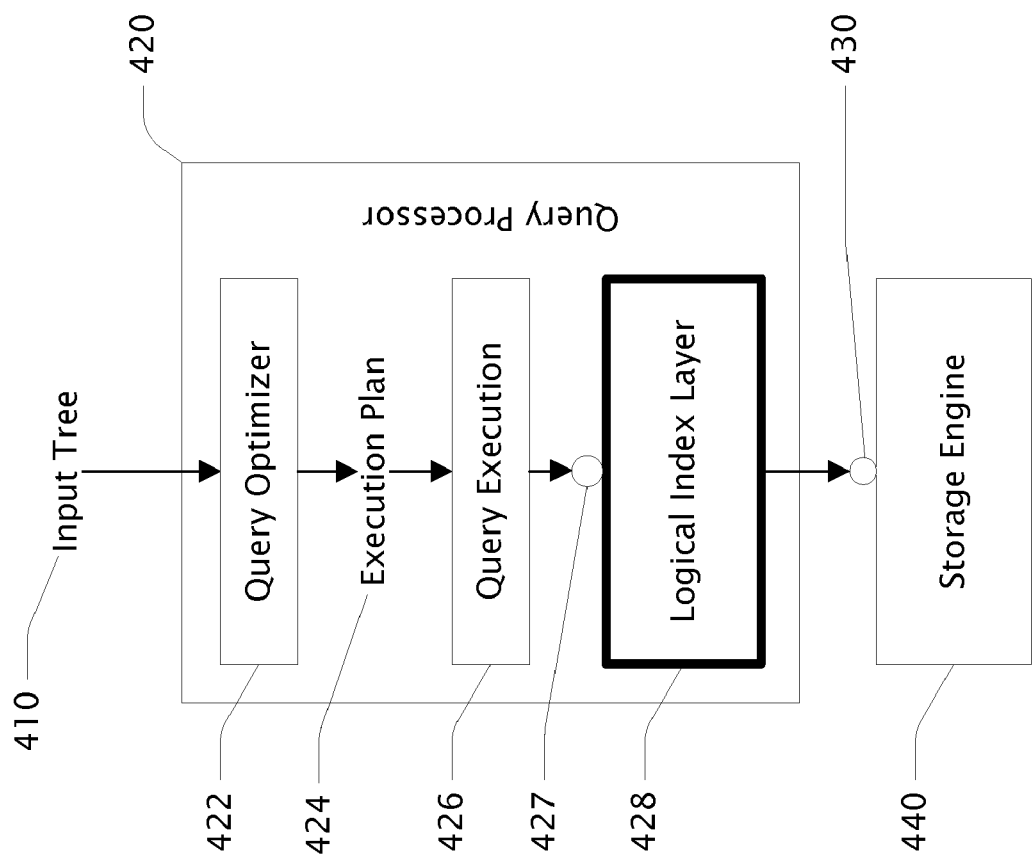
FIG. 4 is a block diagram showing an example query processor with associated input and a storage engine.

FIG. 4 is a block diagram showing an example query processor 420 with associated input 410 and storage engine 440. Query processor 420 typically creates logical indexes on any partitioned tables referenced in input tree 410. Further, the elements and logic (422, 424, 426, and 428) of query processor 420 are operable to process queries using the logical indexes generally without other consideration for the partitions of referenced tables. That is, the logical indexes model the partitioned tables in such as way that the fact that a table is partitioned is abstracted away from query optimization and execution—the logical index allows query optimization and execution to occur as if the table was not partitioned. Finally, logical index layer 428 performs the needed transformations between the logical indexes and referenced table partitions to enable proper access the stored partitioned tables via interface 430 and storage engine 440. In one example, query optimizer 422 creates the logical indexes. Examples of query optimizer and/or query execution functionality, such as those described herein below, may alternatively or additionally be performed in whole or in part by any element or combination of elements of query processor 420.

Input tree 410 represents processed user input. In one example, a user submits a query to a database system, the query is typically parsed, including syntactic and semantic validation, and an input tree is prepared that describes the logical operations necessary to perform the query. Input tree 410 is typically a data structure or the like and may take any form suitable for describing the query to query processor 420.

Query optimizer 422 transforms input tree 410 into execution plan 424 that typically describes the physical operations necessary to execute the query. Execution plan 424 is structured to reference partitioned tables based on logical indexes rather than based on the partitions themselves, thus effectively being unaware of the partitions. Query optimizer 422 typically makes use of order-preserving properties (such as range partitioning of a table) to optimize execution plan 424. For example, given an order-preserving partitioning of table T by (Key), an order-preserving partition function pf(Key) on table T, and a logical index (pID, Key) on the partitions of table T, consider the following query:

SELECT * FROM T ORDER BY Key

Query optimizer 422 is operable to benefit from the order-preserving properties of pf(Key), that is given a query using logical index (pID, Key) with the predicate (pf(Key), Key) query optimizer 422 returns the same sort order result as with the predicate (Key), but eliminates the need for a sort operation required when the predicate (Key) is used. In general, given an order-preserving partitioning of table T, an order-preserving partition function pf(Key) on table T, and a logical index (pID, Key) on the partitions of table T, query optimizer 422 typically forms execution plans for queries on table T such that the predicate (pf(Key), Key) is substituted for (Key), where (Key) represents one or more columns and/or index keys of table T. Benefiting from such order-preserving properties and corresponding logical indexes, query optimizer 422 may form more efficient execution plans than would otherwise be possible.

In another example, query optimizer 422 utilizes logical indexes to form more efficient execution plans for merge-joins than would otherwise be possible. For example, given partitioned tables A and B where table A is partitioned based on partition function $pf_A(\ )$ and table B is partitioned based on partition function $pf_B(\ )$, and given logical indexes ($pID_A$, a) on table A and ($pID_B$, b) on table B, consider a merge-join with the explicit predicate (a=b). Typically such a merge-join could not proceed as the two logical indexes are sorted on their respective pID columns. This limitation may be resolved, based on the properties of the logical indexes, by query optimizer 422 adding an implicit predicate ($pf_A(a)=pf_B(b)$) to the explicit predicate of the merge-join, thus forming a compound predicate ((a=b) AND ($pf_A(a)=pf_B(b)$)). In alternate examples, inequality implicit predicates may be added to corresponding inequality explicit predicates to form inequality compound predicates. For example, for the inequality explicit predicate (a>b) a corresponding inequality implicit predicate ($pf_A(a)>=pf_B(b)$) may be added. By forming an execution plan based at least in part on such compound predicates, the example merge-join may proceed regardless of the type of horizontal table partitions, such as range partitions, hash partitions, or the like.

Query execution 426 typically executes execution plan 424 produced by query optimizer 422. Operators in execution plan 424 may access data stored in tables, such as partitioned tables. Query execution 426 generally does not access the tables directly, but makes use of storage engine interface 427. One example of interface 427 is Object Linking and Embedding Data Base ("OLE DB"). Any other suitable data access methods or interface, such as a standard protocol, an extension to a standard protocol, or the like, may alternatively or additionally be used. Query execution 426 is typically operable to access referenced tables via interface 427 based on logical indexes rather than based on the partitions themselves. In one example, interface 427 and interface 430 are the same data access protocol, such as OLE DB or the like.

Query execution 426 typically makes use of logical indexes when executing execution plan 424. For example, given a partitioning of table T by (a), a partition function pf(a) on table T, and a logical index (pID, b) on the partitions of table T, consider the following query:

SELECT * FROM T WHERE b=3

Query execution 426 is operable to benefit from the logical index (pID, b) and partition function pf(a), that is table T is partitioned on pf(a) and not on the index key of the predicate (b=3). Query execution 426 therefore seeks in each partition of table T for rows matching the predicate (b=3). In alternate examples, the predicate may be an inequality predicate, such as (b<3). Such a seek is referred to herein as a "logical skip scan". In general, query execution 426 is operable to utilize logical index properties and other metadata properties to perform logical skip scan operations on partitioned tables when a query predicate does not include the index key on which the table is partitioned or reference a specific partition.

Logical index layer 428 is coupled between query execution 426 and storage engine 440 so as to provide the needed transforms from partitioned table references in the logical indexes to specific partition identifiers usable by storage engine 440. In general, logical index layer 428 transforms the relevant pID logical index references to the appropriate table partition identifiers sufficient for use by interface 430 and storage engine 440. Such transforms also typically include removing the logical indexes and pID references so that storage engine 440, which does not understand these logical references, is not exposed to them. Storage engine 440 receives access instructions via interface 430 and responds by accessing the stored database table partitions as instructed.

Figure 5:
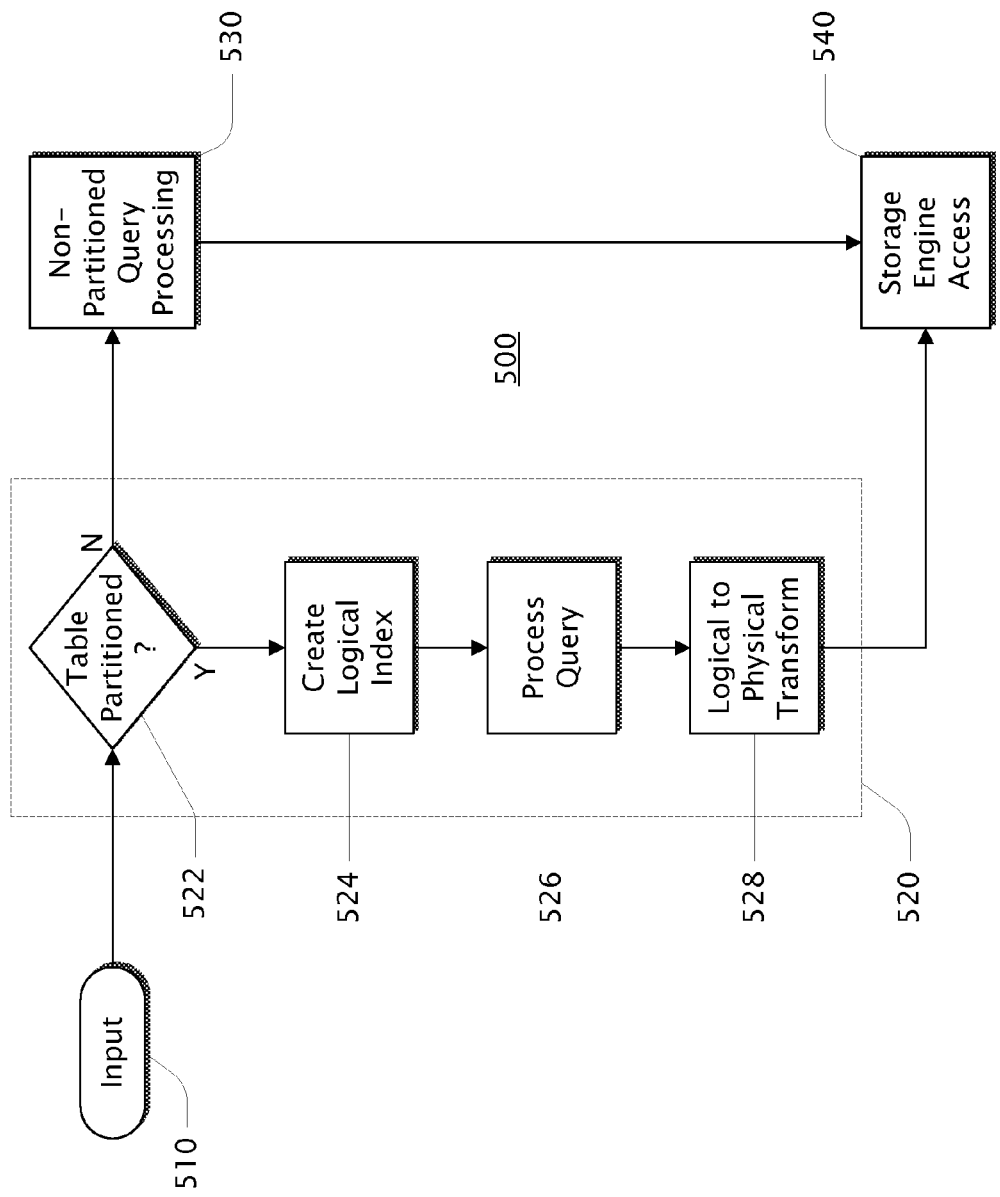
FIG. 5 is a block diagram showing an example method for creating and utilizing a logical index for query processing.

FIG. 5 is a block diagram showing an example method 500 for creating and utilizing a logical index for query processing. Such a method may be carried out by a system including a query processor such as query processor 420 described in connection with FIG. 4. Portion 520 of method 500 represents the portion that may be carried out by an example query processor. The portion of method 500 represented by block 530 may also be performed by portion 520, but will not typically require the creation of a logical index for interacting with non-partitioned tables. As such, method 500 may also be applied to a mix of partitioned and non-partitioned tables.

Block 510 indicates providing input for method 500. Such input typically represents a query, may be provided as a data structure or the like, and may take any form suitable for describing the query. Once input 510 is available, method 500 typically continues at block 522.

Block 522 indicates determining if a table referred to by the input query is a partitioned table. If a table referred to is not a partitioned table, then method 500 typically continues at block 530 and then block 540, which indicates query processing associated with a non-partitioned table and then accessing stored table data. If a table referred to is a partitioned table, then method 500 typically continues at block 524.

Block 524 indicates creating a logical index on the referenced table. Given an input query that references multiple partitioned tables multiple logical indexes may be created. For non-indexed tables, this is typically accomplished by forming a logical index (pID). For indexed tables, this is typically accomplished by forming a logical index (pID, Key), the leading column for pID followed by column(s) for Key, with a row for each row of the indexed table. The pID value in each row of the pID column is typically calculated using a partition function, pf(Key) where row value pID=pf(Key) and where Key is the key value of the corresponding row in the indexed partitioned table. Once the logical index is created, method 500 typically continues at block 526.

Block 526 indicates processing the query. This typically includes forming an execution plan using the logical index and executing the execution plan using the logical index. Execution typically involves the step indicated by block 528.

Block 528 indicates transforming execution plan logical index partition references to partition identifiers suitable for submission to a storage engine interface. Once the appropriate transforms haves been made, method 500 typically continues at block 540.

Block 540 indicates accessing referenced table data via a data base storage engine or the like. Such access may include reads, writes, commits, or any other type of table data access.

Figure 6:
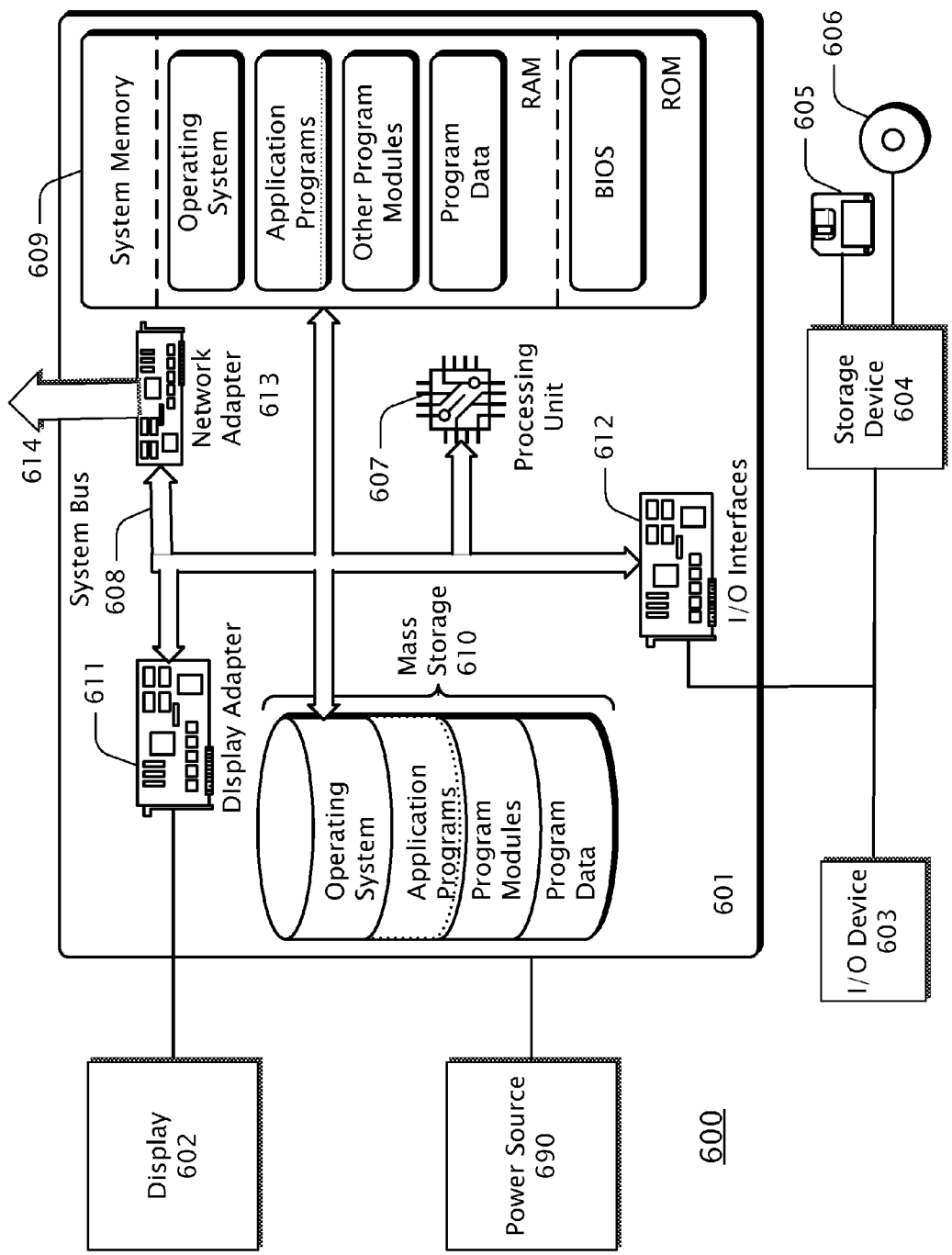
FIG. 6 is a block diagram showing an example computing environment in which the technologies, systems, and methods described herein may be implemented.

FIG. 6 is a block diagram showing an example computing environment 600 in which the technologies, systems, and methods described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 600 typically includes a general-purpose computing system in the form of a computing device 601 coupled to various components, such as peripheral devices 602, 603, 604 and the like. System 600 may couple to various other components, such as input devices 603, including voice recognition, touch pads, buttons, keyboards and/or pointing devices, such as a mouse or trackball, via one or more input/output ("I/O") interfaces 612. The components of computing device 601 may include one or more processors (including central processing units ("CPU"), graphics processing units ("GPU"), microprocessors ("µP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored in mass storage 610, other storage devices 604, 605, 606 and system memory 609 (typically limited by available space) including, by way of example and not limitation, operating systems, application programs, data files, directory structures, computer-executable instructions, and the like.

Output components or devices, such as display device 602, may be coupled to computing device 601, typically via an interface such as a display adapter 611. Output device 602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 601 to interact with human operators or other machines, systems, computing environments, or the like. A user may interface with computing environment 600 via any number of different I/O devices 603 such as a touch pad, buttons, keyboard, mouse, joystick, game pad, data port, and the like. These and other I/O devices may be coupled to processor 607 via I/O interfaces 612 which may be coupled to system bus 608, and/or may be coupled by other interfaces and bus structures, such as a parallel port, game port, universal serial bus ("USB"), fire wire, infrared ("IR") port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 690, such as a battery or a power supply, typically provides power for portions or all of computing environment 600. In the case of the computing environment 600 being a mobile device or portable device or the like, power source 690 may be a battery. Alternatively, in the case computing environment 600 is a desktop computer or server or the like, power source 690 may be a power supply designed to connect to an alternating current ("AC") source, such as via a wall outlet.

Some mobile devices may not include many of the components described in connection with FIG. 6. For example, an electronic badge may be comprised of a coil of wire along with a simple processing unit 607 or the like, the coil configured to act as power source 690 when in proximity to a card reader device or the like. Such a coil may also be configure to act as an antenna coupled to the processing unit 607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 602, I/O device 603, or many of the other components described in connection with FIG. 6. Other mobile devices that may not include many of the components described in connection with FIG. 6, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method of creating a logical index on a partitioned table, the method comprising appending, by a computing device, a key column from an index on the partitioned table to the logical index that includes each row of the index, where each row in a partition identifier column of the logical index that corresponds to the each row of the index includes a partition identifier that identifies a partition of the partitioned table, where the logical index includes one row for each row in each partition of the partitioned table, each one row of the partition identifier column including a unique partition identifier that identifies a unique partition of the partitioned table, and where the partition identifier is equal to a return value from pf(Col) where pf is a partition function and Col is a value from an index column at the each row.

2. The method of claim 1 wherein the first predicate or the second predicate is an equality predicate.

3. The method of claim 1 wherein the first predicate or the second predicate is an inequality predicate.

4. A system for processing a query against a partitioned table, the system comprising a computing device that includes a query optimizer configured for adding a second predicate of the form $(pf_A(a)=pf_B(b))$ to a first predicate of the form (a=b) resulting in a compound predicate of the form ((a=b) AND $(pf_A(a)=pf_B(b))$) where $pf_A(\ )$ is a partition function, and where $pf_B(\ )$ is a second partition function of a second partitioned table, and where a is a first value from a logical index on the partitioned table, and where b is a second value from a second logical index on the second partitioned table, and where the query optimizer is configured for substituting a second term of the form (pf(Col), Col) for a first term of the form (Col) where pf( ) is the partition function and Col is a column value from the logical index.

5. The system of claim 4 further comprising a logical index layer configured to transform a reference to a partition of the partitioned table to a corresponding partition identifier.

6. The system of claim 4 wherein the partition function is an order-preserving partition function.

7. The system of claim 4 wherein the first predicate or the second predicate is an equality predicate.

8. The system of claim 4 wherein the first predicate or the second predicate is an inequality predicate.

9. The system of claim 4 wherein the computing device is configured to perform a merge-join operation using the compound predicate in combination with the logical index.

10. The system of claim 4 further comprising a query execution element coupled to the query optimizer and configured to perform a logical skip scan operation in response to the query, wherein the query does not include a term that references a specific partition.

11. A method for processing a query on a partitioned table, the method comprising:
  creating, by a computing device, a logical index on the partitioned table, the logical index including a partition identifier column the row values of which are computed by a partition function, the computed row values each referencing a partition of the partitioned table;
  adding, by the computing device, a second predicate of the form $(pf_A(a)=pf_B(b))$ to a first predicate of the form (a=b) of the query to form a compound predicate of the form (a=b) AND $(pf_A(a)=pf_B(b))$ where $pf_A(\ )$ is the partition function of the partitioned table, and where $pf_B(\ )$ is a second partition function of a second partitioned table, and where a is a first key value from the logical index, and where b is a second key value from a second logical index on the second partitioned table;

processing, by the computing device, the query using the compound predicate in combination with the logical index as if the partitioned table was not partitioned.

12. The method of claim 11 further comprising forming an execution plan for the query as if the partitioned table was not partitioned, the execution plan based on the compound predicate in combination with the logical index.

13. The method of claim 12 further comprising executing the execution plan as if the partitioned table was not partitioned.

14. The method of claim 11 further comprising substituting a second term of the form (pf(Col), Col) for a first term of the form (Col) where pf( ) is the partition function, and where Col is a column value from the logical index.

15. The method of claim 11 wherein the first predicate or the second predicate is an inequality predicate.

16. The method of claim 11 further comprising performing a logical skip scan operation in response to the query, wherein the query does not include a term that references a specific partition.

17. The method of claim 11 wherein the partition function is an order-preserving partition function.

* * * * *